March 19, 1929.   R. L. CORBY   1,705,636

BAKING METHOD AND APPARATUS

Filed March 12, 1925

INVENTOR
Robert L. Corby
BY
Mayer, Warfield & Wilson
ATTORNEYS

Patented Mar. 19, 1929.

1,705,636

UNITED STATES PATENT OFFICE.

ROBERT L. CORBY, OF NEW YORK, N. Y., ASSIGNOR TO THE FLEISCHMANN COMPANY, OF NEW YORK, N. Y., A CORPORATION OF OHIO.

BAKING METHOD AND APPARATUS.

Application filed March 12, 1925. Serial No. 14,875.

This invention relates to baking methods and to apparatus therefor, and in its more specific aspects has reference to the construction of baking pans.

An object of the invention is to provide an improved method and means whereby the baking operation and the shape of the loaf may be efficiently controlled.

Another object is directed to the provision of a method and means whereby the crust of a loaf may be caused to split during the baking operation at a predetermined point.

A further object is that of providing a baking pan embodying means of the aforesaid type.

Other objects of the invention will in part be obvious and will in part appear hereinafter.

The invention accordingly comprises the several steps and the relation and order of one or more of such steps with respect to each of the others, and the apparatus embodying features of construction, combinations of elements and arrangement of parts which are adapted to effect such steps, all as exemplified in the following detailed disclosure, and the scope of the application of which will be indicated in the claims.

For a fuller understanding of the nature and objects of the invention reference should be had to the following detailed description taken in connection with the accompanying drawing, in which.

In the baking of bread a crust is formed on the exposed or unrestricted surface of the loaf (i. e., that portion of the surface of the loaf which is out of contact with the receptacle upon which the loaf is baked) before the dough has expanded to its full extent. As the dough expands thereafter during the baking operation it will press upwardly and outwardly against this crust so as to cause splits or cracks to be formed therein at those points on the surface of the loaf where the crust is weakest. Inasmuch as the conditions under which a loaf is baked vary both with the position of the loaf in the oven and with the heat circulation in a particular baking operation, the points on the exposed surface of the loaf whereat the crust is weakest will vary greatly with different loaves, and the splits or cracks in the surface thereof will be formed at different points. Now as a rule it is desirable that a loaf of bread should have a generally rounded contour which possesses a neat and trim appearance; it is also desirable in many cases that a series of loaves should have substantial uniformity of contour. The latter condition is particularly desirable when baking a series of test loaves from which the expansibility or other qualities of different types of dough is to be determined, as the factor involving individuality of shape is thereby eliminated thereby making for simpler methods of testing. In the practice of the invention, the exposed surfaces of the various loaves are treated in such a manner that the crusts of the same will split at similar points. This result is obtained by heating the major portion of the exposed surface of the dough early in the baking operation to a greater extent than that portion of the surface whereat it is desired that the splitting take place. In this manner there is formed over most of the surface an unusually hard crust which cannot be split readily; and the force exerted by the expanding dough will in consequence tend to split that portion of the crust which has been heated to a lesser extent. Various means may be employed to heat the crust, either by directing heat rays against the loaf or by passing a current of heated air over it.

Figure 5:
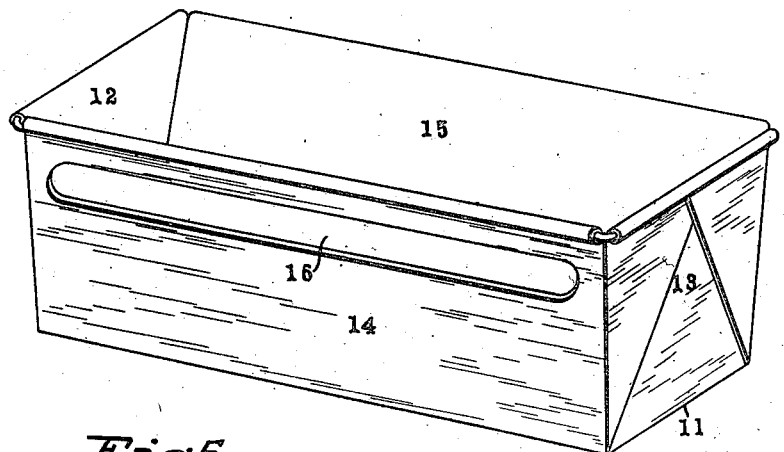
Fig. 5 illustrates details of a baking pan constructed for use in the practice of the invention.

A convenient apparatus arranged for this purpose and adapted to heat a portion of the exposed surface of the loaf in both of these ways is shown in Fig. 5. This apparatus comprises a baking pan 10 formed with a usual base 11, end-walls 12 and 13 and side-walls 14 and 15. Here there is shown, near the top of the side-wall 14, an aperture taking the form of a narrow slot 16 which extends substantially from end to end of the pan and is adapted to permit passage therethrough and against one side of the outer surface of the loaf of heat rays reflected from the walls of the oven or from the surface of an adjacent pan and heated air which is drawn therethrough due to the convection currents set up within the pan.

Figure 1:
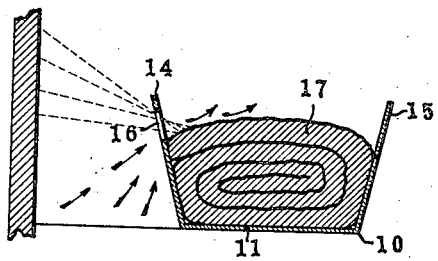
Figures 1, 2 and 3 illustrate successive steps in a method of baking of a loaf of bread in accordance with the invention.
Figure 2:
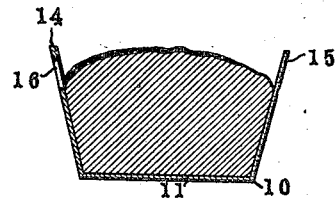
Figure 3:
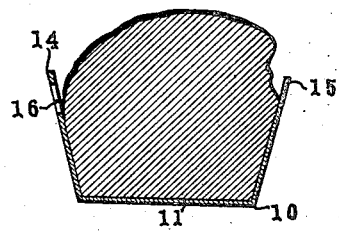
Figure 4:
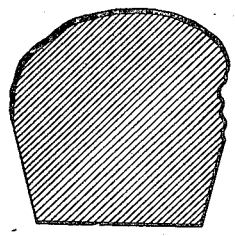
Fig. 4 illustrates a loaf of bread such as is produced by this method.

In accordance with the steps here exemplified, a mass of dough 17 is placed in position on suitable holding means, which consists in the present instance of the pan 10; the size of the mass being such that one side of its upper surface will be adjacent to the slot 16. The pan having been placed in an oven of any suitable type, the baking of the loaf is commenced and as soon as the oven conditions are such as to cause a crust to be formed anywhere on the exposed surface of the loaf, the heat rays and the heated air passing through the slot 16 as indicated respectively by the dotted lines and the arrows in Fig. 1 will cause a relatively hard crust to be formed on the surface of the loaf adjacent the side 14. The exposed surface of the loaf on the other side of the pan, being shielded by the side-wall 15, will be considerably weaker, and therefore as the loaf expands thereafter during the baking any splits or cracks in the surface of the loaf which may occur, will take place at a predetermined point, namely adjacent the side wall 15. During the baking of the dough moreover the moisture-charged gases contained therein will tend to escape through the splits already formed in crust, and in escaping act to lower the temperature of the surface of the dough adjacent to the splits. Thus, in the present instance, that portion of the crust adjacent the side 15 is maintained weak by the escape of these gases so that if the expansion of the dough is sufficient to cause any further splitting, this splitting will take place at points adjacent the original split. In this way there is produced a loaf such as illustrated in Fig. 4 having a crust thereon which is split only at one side and which, therefore, presents a pleasing appearance and is readily adapted for use in tests wherein it is to be compared with other loaves formed in a similar manner. For example, such a loaf is well suited for use in connection with the testing methods and apparatus disclosed in my co-pending application filed of even date herewith, Serial No. 14,876.

It will be understood that the term "bread" as used herein is intended to indicate baked dough regardless of the constituents of the dough or of the shape or size of the loaf produced.

Since certain changes in carrying out the above process and in the constructions set forth, which embody the invention may be made without departing from its scope, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which as a matter of language might be said to fall therebetween.

Having described my invention, what I claim as new and desire to secure by Letters Patent is:

1. The method of controlling the contour of a loaf of bread, which comprises forming a harder crust over one side of the unrestricted surface thereof than over the other side of said surface.

2. The method of controlling the contour of a loaf of bread, which comprises heating one side of the exposed surface of the loaf to a greater extent than the other side of said surface.

3. The method of controlling the contour of a loaf of bread, which comprises directing a current of heated air against a limited area at only one side of the exposed surface of the loaf.

4. The method of controlling the contour of a loaf of bread, which comprises forming a hard crust on one side of the exposed surface of the loaf and subsequently forming a hard crust on the remaining portions of the exposed surface.

5. The method of controlling the contour of a loaf of bread which comprises applying excess heat to one side of the exposed surface of the loaf whereby a hard crust is formed more rapidly on said one side of the exposed surface than on the remaining portions thereof.

6. The method of preventing one side portion of the crust of a loaf of bread from splitting during the baking thereof, which comprises heating said one side portion to a greater extent than the other side of the crust.

7. A baking pan adapted to receive a mass of dough and comprising means to direct a current of heated air against one side only, of the upper surface of the dough, and means to deflect air from the other side of the loaf.

8. A baking pan comprising bottom and side walls, one of said side walls being formed with a narrow opening extending substantially throughout the length thereof and the corresponding portion of the opposite side wall being substantially impervious.

In testimony whereof I affix my signature.

ROBERT L. CORBY.